(12) United States Patent
Takeda et al.

(10) Patent No.: US 11,909,696 B2
(45) Date of Patent: Feb. 20, 2024

(54) UPLINK CONTROL INFORMATION (UCI) TRANSMISSION FOR BANDWIDTH PART (BWP) SWITCHING

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 538 days.

(21) Appl. No.: 17/260,426

(22) PCT Filed: Jul. 17, 2018

(86) PCT No.: PCT/JP2018/026769
§ 371 (c)(1),
(2) Date: Jan. 14, 2021

(87) PCT Pub. No.: WO2020/016938
PCT Pub. Date: Jan. 23, 2020

(65) Prior Publication Data
US 2021/0266139 A1    Aug. 26, 2021

(51) Int. Cl.
*H04L 5/14* (2006.01)
*H04L 5/16* (2006.01)
*H04W 72/0446* (2023.01)
*H04W 72/0453* (2023.01)
*H04W 72/23* (2023.01)

(52) U.S. Cl.
CPC .............. *H04L 5/1469* (2013.01); *H04L 5/16* (2013.01); *H04W 72/0446* (2013.01); *H04W 72/0453* (2013.01); *H04W 72/23* (2023.01)

(58) Field of Classification Search
CPC ....... H04L 5/1469; H04L 5/16; H04L 5/0098; H04L 1/1854; H04L 1/1896; H04L 5/001; H04L 5/0042; H04L 5/0053; H04W 72/23; H04W 72/0446; H04W 72/0453; H04W 72/1268; H04W 72/1289
See application file for complete search history.

(56) References Cited

U.S. PATENT DOCUMENTS

| 2015/0003302 A1 | 1/2015 | Ekpenyong |
| 2016/0218853 A1 | 7/2016 | Takeda et al. |

(Continued)

FOREIGN PATENT DOCUMENTS

| JP | 2015-070295 A | 4/2015 |
| JP | 2016-530761 A | 9/2016 |
| WO | 2018128183 A1 | 7/2018 |

OTHER PUBLICATIONS

WO 2019/157696 A1 (Year: 2019).*

(Continued)

*Primary Examiner* — Rushil P. Sampat
(74) *Attorney, Agent, or Firm* — Osha Bergman Watanabe & Burton LLP

(57) ABSTRACT

A terminal is disclosed including a transmitter that performs an uplink (UL) transmission; and a receiver that performs a downlink (DL) reception, wherein the transmitter does not perform the UL transmission in a period after a last symbol of the DL reception. In other aspects, a radio communication method, a base station, and a system are also disclosed.

4 Claims, 14 Drawing Sheets

(56) References Cited

U.S. PATENT DOCUMENTS

| | | | |
|---|---|---|---|
| 2018/0084513 A1 | 3/2018 | Sheashua et al. | |
| 2018/0124770 A1 | 5/2018 | Yerramalli et al. | |
| 2019/0089583 A1* | 3/2019 | Islam | H04L 41/0803 |
| 2019/0373600 A1 | 12/2019 | Takeda et al. | |
| 2020/0229231 A1* | 7/2020 | Oh | H04W 80/08 |
| 2020/0344034 A1* | 10/2020 | Moon | H04L 5/0094 |
| 2020/0358587 A1* | 11/2020 | Wang | H04L 1/1896 |

OTHER PUBLICATIONS

Extended European Search Report issued in Application No. 18926439.3 dated Feb. 4, 2022 (8 pages).

Ericsson, "Remaining issues on CW mapping and data scrambling", 3GPP TSG RAN WG1 Meeting #92bis, R-1804967, Sanya, China, Apr. 16-20, 2018 (5 pages).

Office Action issued in Japanese Application No. 2020-530768; dated Jul. 5, 2022 (6 pages).

Office Action issued in Japanese Application No. 2020-530768; dated Feb. 14, 2023 (4 pages).

Takeda, K. et al.; "Status of Investigations on Physical-layer Elemental Technologies and High-frequency-band Utilization"; The NTT DOCOMO Technical Journal, vol. 19, No. 3, Jan. 2018, pp. 24-33 (22 pages).

International Search Report issued in PCT/JP2018/026769 dated Sep. 18, 2018 (4 pages).

Written Opinion of the International Searching Authority issued in PCT/JP2018/026769 dated Sep. 18, 2018 (5 pages).

3GPP TS 38.211 V2.0.0; "3rd Generation Partnership Project; Technical Specification Group Radio Access Network; NR; Physical channels and modulation (Release 15)"; Dec. 2017 (6 pages).

Qualcomm Incorporated; "Contents of group common PDCCH"; 3GPP TSG RAN WG1 Meeting #90, R1-1713423; Prague, Czech Republic; Aug. 21-25, 2017 (8 pages).

3GPP TS36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Indian Application No. 202137005509 dated Oct. 19, 2022 (7 pages).

Office Action in counterpart Japanese Patent Application No. 2020-530768 dated Apr. 19, 2022 (6 pages).

Office Action issued in the counterpart Chinese Application No. 201880095697.1, dated Jul. 14, 2023 (18 pages).

Office Action issued in the counterpart Japanese Application No. 2020-530768, dated Sep. 5, 2023 (12 pages).

Huawei, Hisilicon: "TP for 38.803: NR timing budget", 3GPP TSG-RAN WG4 Meeting #82AH R4-1700125; Spokane, US, Jan. 17-19, 2017 (7 pages).

Huawei, HiSilicon: "Further discussion on BS synchronization requirements in NR", 3GPP TSG-RAN WG4 Meeting NR#2 R4-1706734; Qingdao, China, Jun. 27-29, 2017 (4 pages).

* cited by examiner

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

FIG. 1

UPLINK CONTROL INFORMATION (UCI) TRANSMISSION FOR BANDWIDTH PART (BWP) SWITCHING

TECHNICAL FIELD

The present disclosure relates to a user terminal in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10 to Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 15" (or later versions), and so on) are also under study.

In the existing LTE systems (for example, LTE Rel. 10 or later versions), carrier aggregation (CA) integrating a plurality of carriers (component carriers (CC), cells) has been introduced aiming at further wider bandwidth. Each carrier is configured with a system band of LTE Rel. 8 as one unit. In the CA, a plurality of CCs of the same radio base station (eNB: eNodeB) are configured for a user terminal (UE: User Equipment).

In the existing LTE system (for example, LTE Rel. 12 or later versions), dual connectivity (DC) that a plurality of cell groups (CGs) of different radio base stations are configured for the user terminal has been introduced. Each cell group includes at least one carrier (CC, cell). Since a plurality of carriers of different radio base stations are integrated, the DC is called inter-base station CA (Inter-eNB CA) or the like.

In the existing LTE system (for example, LTE Rel. 14 or previous versions), Time Division Duplex (TDD) that switches between downlink (DL) communication and uplink (UL) communication to be performed in terms of time, and Frequency Division Duplex (FDD) that performs downlink communication and uplink communication in different frequency bands have been introduced.

The TDD, in which communication in DL and communication in UL are switched in terms of time in the same frequency band, is a half-duplex communication scheme that only either transmission or reception can be performed in any time zone. The FDD, in which communication in DL and communication in UL are performed in different frequency bands, is a full-duplex communication scheme that transmission and reception can be simultaneously performed in any time zone depending on a user terminal capability, in addition to the half-duplex communication scheme.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

The TDD of the existing LTE system has been configured to switch UL and DL in units of a subframe, whereas a future radio communication system (hereinafter, also referred to as a NR) supports also a configuration in which UL and DL are switched in units of a symbol. In this case, how to control the half-duplex communication is a problem.

Therefore, an object of the present disclosure is to provide a user terminal capable of properly controlling half-duplex communication in future radio communication systems.

Solution to Problem

A user terminal according to an aspect of the present disclosure includes a receiving section that receives information about a slot format for one or more cells, and a control section that determines a slot format of each cell based on the information about the slot format, and whether full-duplex communication is supported, or whether simultaneous transmission and reception of a UL signal and a DL signal (UL transmission and DL reception) is supported.

Advantageous Effects of Invention

According to an aspect of the present disclosure, half-duplex communication can be properly controlled in future radio communication systems.

BRIEF DESCRIPTION OF DRAWINGS

FIG. 1 is a diagram to show an example of a table used in reporting information about a slot format from a base station to a UE by use of DCI;

DESCRIPTION OF EMBODIMENTS

Figure 2:
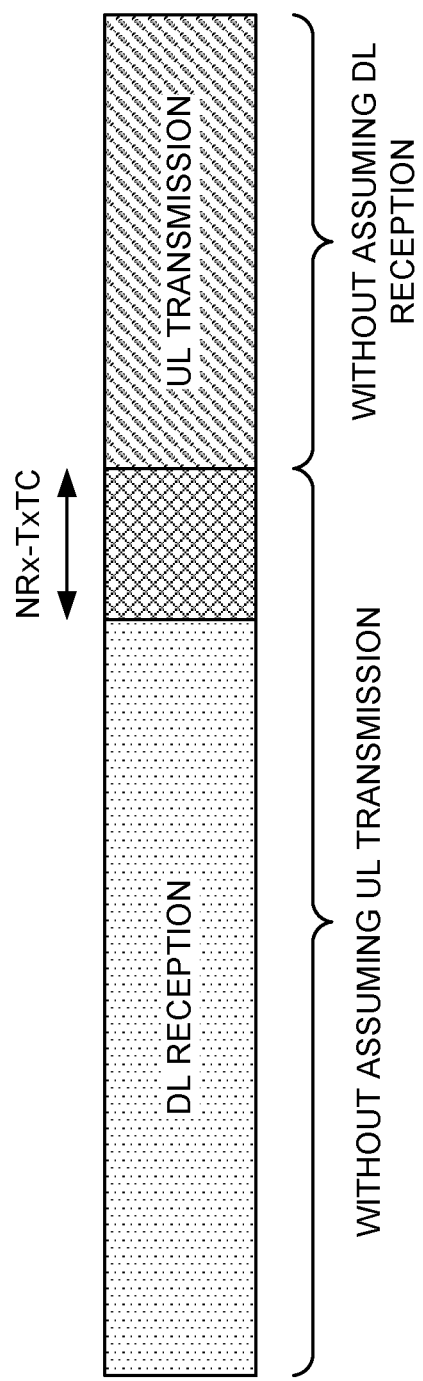
FIG. 2 is a diagram to show an example of transmission/reception control on a DL signal and a UL signal in half-duplex communication according to the present embodiment.

In the existing LTE systems (for example, Rel. 14 or previous versions), structures of UL communication and DL communication are defined as, for example, FDD (also referred to as frame structure type 1) and TDD (also referred to as frame structure type 2).

In frame structure type 1 (FDD), for example, DL transmission of 10 subframes and UL transmission of 10 subframes can be performed in a radio frame (time interval of 10 ms). The DL transmission of 10 subframes and the UL transmission of 10 subframes are performed in respective frequency domains separate from each other.

In a case that full-duplex communication is adopted in the FDD, a UE can simultaneously perform UL transmission and DL reception. On the other hand, in a case that half-duplex communication is adopted in the FDD (for example, in a case that the full-duplex communication is not supported), the UE cannot perform simultaneously transmission/reception of a DL signal and a UL signal (UL transmission and DL reception).

In frame structure type 2 (TDD), UL transmission and DL reception are performed to be switched in the same frequency domain, where a gap (GP) period is configured in switching the DL and the UL. In a case that communication is performed using a plurality of cells in the TDD (for example, in a case that carrier aggregation is used), the UE assumes (expects) that guard periods of a special subframe between cells overlap for a certain period.

In a case that mutually different UL/DL configurations are applied to a plurality of cells adopting the CA, and the UE does not have simultaneous transmission and reception capability for the plurality of cells, the following operations are performed in the subframes different in the UL/DL configuration.

In a case that a subframe for a primary cell is a DL subframe (a subframe for a secondary cell is a UL subframe), the UE does not transmit a signal or channel in the secondary cell.

In a case that the subframe for the primary cell is a UL subframe (the subframe for the secondary cell is a DL subframe), the UE does not assume (expect) receiving a DL signal in the secondary cell.

In a case that the subframe for the primary cell is a special subframe, and the subframe for the secondary cell is a DL subframe, the UE does not assume (expect) reception of a certain channel or signal in the secondary cell, and does not assume (expect) reception of other channels or signals in an OFDM symbol in the secondary cell overlapping a guard period or UpPTS (Uplink Pilot Time Slot) in the primary cell.

Note that the certain channel and signal may be at least one of PDSCH (Physical Downlink Shared Channel), EPDCCH (Enhanced Physical Downlink Control Channel), PMCH (Physical Multicast Channel), and PRS (Positioning Reference Signal). Other channels and signals may be a broadcast signal, or a paging channel, and the like.

In the NR, supported is a configuration in which a slot format is changed, not in units of a subframe as in existing LTE, but in units of a symbol that constitutes a subframe to control the UL and the DL to be switched.

For example, the base station transmits information about the slot format to the UE. The UE determines a sending direction of each symbol in a slot, based on the information about the slot format transmitted from the base station to control transmission/reception. The information about the slot format may be reported from the base station to the UE through higher layer signaling (for example, at least one of tdd-UL-DL-ConfigurationCommon, tdd-UL-DL-configurtaionCommon2, and tdd-UL-DL-ConfigDedicated). Alternatively, the information about the slot format may be reported from the base station to the UE through downlink control information (for example, slot format indicator (SFI)).

The information about the slot format may include "U" indicating the UL communication, "D" indicating the DL communication, and "F" indicating flexibility that specifies neither the UL communication nor the DL communication. FIG. 1 is a diagram to show an example of a table used in reporting the information about the slot format (for example, also referred to as the SFI) from the base station to the UE by use of the DCI. The UE may determine the slot format based on bit information included in the DCI transmitted from the base station and the table in FIG. 1.

Here, the NR supports the change of the slot format in units of a symbol that constitutes a subframe, not in units of a subframe as in existing LTE, and in such a case, how to control the half-duplex communication is a problem.

For example, how the UE not supporting the full-duplex communication controls the DL reception and the UL transmission in the same cell (or another cell (for example, neighbor cell)) is a problem.

The inventors of the present invention focused on an issue that in a case that the UE performing the half-duplex communication (for example, the UE not supporting the full-duplex communication) switches between the DL communication (for example, DL reception) and the UL communication (for example, UL transmission) to be performed, time periods are needed in which the UL communication and the DL communication are to be limited, and came up with the idea of control in the half-duplex communication.

The inventors of the present invention focused on an issue that in a case that the UE not supporting the full-duplex communication performs communication using a plurality of cells (for example, CA), an interference may occur depending on a structure of the slot format configured for each cell. For example, in a case that the mutually different slot formats (UL/DL configurations) are applied to a plurality of cells, if the cells are adjacent (neighbor) to each other, the UL signal transmission and the DL signal reception (UL transmission and DL reception) may interfere with each other in the UE to deteriorate a quality of the communication.

Then, the inventors of the present invention came up with the idea of controlling the slot format used in each cell, based on a relationship (or type) of a plurality of cells or the like. For example, the inventors came up with the idea that the UE assumes (expects) that the same slot format is applied to a certain cell (or a certain frequency domain). Alternatively, the inventors of the present invention came up with the idea of controlling such that a network (for example, the base station) reports the information about the same slot format in a certain cell (or a certain frequency domain).

Hereinafter, embodiments according to the present disclosure will be described in detail with reference to the drawings. The embodiments may be employed independently or in combination. In the following description, information about the SFI may be transmitted from the base station to the UE through at least one of higher layer signaling (for example, at least one of tdd-UL-DL-ConfigurationCommon, tdd-UL-DL-configurtaionCommon2, and tdd-UL-DL-ConfigDedicated), and the downlink control information (for example, the SFI).

The UE not supporting the full-duplex communication may be interpreted as a UE not simultaneously supporting the DL reception and the UL transmission, or a UE not simultaneously supporting transmitting and receiving to and from a CA band combination including a SUL. A structure illustrated in the following description can be preferably applied to the UE not supporting the full-duplex communication, but is not limited to such application and may be applied to the UE supporting the full-duplex communication.

(First Aspect)

In a first aspect, the UE not supporting the full-duplex communication controls a DL reception and a UL transmission to be limited for a certain period.

As shown in FIG. 2, in a case of switching from a DL transmission (DL-rx) to a UL transmission (UL-tx), the UE not supporting the full-duplex communication controls the UL transmission to be not performed for a certain period after the DL reception. For example, the UE operates without assuming (do not expecting) the UL transmission (UL-tx) until a certain period (for example, $N_{RX-TX}T_C$) elapses from the end of a DL symbol received the last (or the most recently) in the same cell.

The certain period (for example, $N_{RX-TX}T_C$) may has a value predefined in a specification, or a value reported from the base station the UE. The DL transmission may be transmission of at least one of downlink control information (for example, PDCCH) and DL data (for example, PDSCH), and the UL transmission may be transmission of at least one of uplink control information (for example, PUCCH) and UL data (for example, PUSCH). Of course, a signal or channel in the DL and the UL is not limited to those described above.

Furthermore, the UE controls the operation without assuming (do not expecting) the UL transmission during the DL reception or for a period while the slot format is set to "D" (that is, before the end of the DL symbol received the last in FIG. 2). The UE controls the operation without assuming (do not expecting) the DL reception during the UL transmission or for a period while the slot format is set to "U" (that is, in the UL transmission after the certain period elapses in FIG. 2).

Specifically, the UE operates without assuming (do not expecting) transmitting at least one of the UL signal and the UL channel (hereinafter, referred to as the UL signal), during receiving at least one of the DL signal and the DL channel (hereinafter, referred to as the DL signal) and until the certain period elapses from the end of the DL symbol received the last in the same cell. Furthermore, the UE operates without assuming (do not expecting) receiving the DL signal during the UL transmission after the certain period elapses.

In this way, the operation of the UE is controlled for the DL reception period (or the period while the slot format is set to "D"), at a UL transmission start timing after the DL, and for the UL transmission period (or the period while the slot format is set to "U"). This allows the UE to properly perform the half-duplex communication with reliably preventing the UL signal from being transmitted during receiving the DL signal and for the subsequent certain period, and the DL signal from being received during transmitting the UL signal (UL transmission). As a result, the transmission and reception of the DL signal and the UL signal (UL transmission and DL reception) can be properly controlled in the half-duplex communication.

Note that the case of the application in the same cell is described above as an example, but the application is not limited thereto. The above configuration may be applied to communication in different cells (for example, a certain cell group or the like).

(Second Aspect)

In a second aspect, in the case of performing the communication using a plurality of cells (for example, CA), controlling is performed such that the same slot format is applied to a combination of certain cells.

In carrier aggregation, a user terminal uses a plurality of cells to transmit the UL signal and receive the DL signal (perform UL transmission and DL reception). In a case that a slot format is separately configured for each of the cells, the respective cells may be configured with the mutually different slot formats (UL/DL structures).

Figure 3:
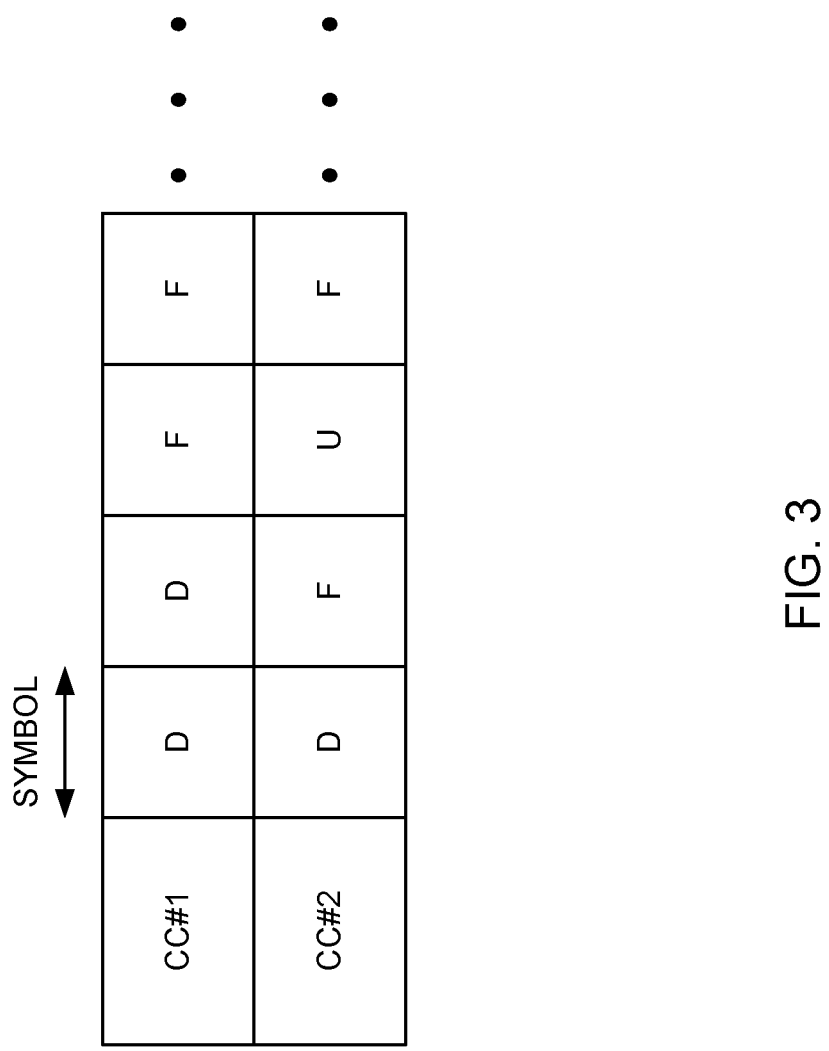
FIG. 3 is a diagram to show an example of a case that two component carriers are configured with mutually different slot formats.

FIG. 3 is a diagram to show an example of a case that two CCs (or cells) are configured with mutually different slot formats (for example, UL/DL structures). CC #1 is configured with DL, DL, flex, and flex in a time series order. CC #2 is configured with DL, flex, UL, and flex in a time series order.

In the UE not supporting the full-duplex communication, in a case that the mutually different slot formats are applied to a plurality of cells, if the cells are sufficient far from each other, an interference between the cells does not problematically occur. In contrast, if the cells are adjacent (neighbor) to each other, the UL signal transmission and the DL signal reception (UL transmission and DL reception) may interfere with each other in the user terminal to deteriorate the quality of the communication.

Then, in the second aspect, the UE not supporting the full-duplex communication controls the half-duplex communication assuming (expecting) not simultaneously performing transmission and reception in at least one of the same cell and the combination of certain cells. The UE may transmit, for each cell or for each combination of a plurality of cells, UE capability information indicating whether the full-duplex communication or the simultaneous transmission and reception of the UL signal and the DL signal (UL transmission and DL reception) is supported (for example, Capability signaling, or simultaneousRxTxSUL) to the base station.

The base station controls such that the same slot format is configured (or transmitted) to the combination of a plurality of certain cells, based on the received UE capability information, when the UE does not support the full-duplex communication or the simultaneous transmission and reception of the UL signal and the DL signal (UL transmission and DL reception) (hereinafter, simply referred to as the full-duplex communication). This can prevent the UL signal transmission and the DL signal reception (UL transmission and DL reception) from interfering (collide) with each other in the UE in the communication using the combination of a plurality of cells.

For example, the base station may control such that the information about the same slot format for a plurality of certain cells is transmitted to the UE not supporting the full-duplex communication or the UE adopting the half-duplex communication. The plurality of certain cells may be a combination of cells included in a certain frequency domain.

The UE may determine, in a case of receiving the information about the slot format for one or more cells, the slot format of each cell, based on the information about the slot format, and whether the full-duplex communication is supported or whether the simultaneous transmission and reception of the UL signal and the DL signal (UL transmission and DL reception) is supported. For example, the UE may apply the same slot format to the plurality of cells included in the certain frequency domain. Alternatively, the UE may determine a slot format of another cell included in the certain frequency domain, based on the information about the slot format reported for the certain cell. Alternatively, the UE may assume (expect) that the information about the slot formats reported for a plurality of cells included in the certain frequency domain is the same.

Here, how to configure a "certain frequency domain" may include, for example, a case based on a "frequency band" and a case based on a "frequency range". In both cases, the UE not supporting the full-duplex communication or the simultaneous transmission and reception of the UL signal and the DL signal (UL transmission and DL reception) does not assume (expect) simultaneously transmitting and receiving the UL signal and the DL signal (UL transmission and DL reception) in the same cell and the certain combination of a plurality of cells.

Hereinafter, Aspect 1 to Aspect 3 are described as examples of the aspect in which the same slot format is applied (or assumed to be applied). Note that the UE can determine the slot format of each cell by use of at least one aspect.

(Aspect 1)

In Aspect 1, the cells to which the same slot format is applied are controlled based on the frequency band. Specifically, this corresponds to the case the certain frequency domain described above is the frequency band.

The UE receives, in a half-duplex operation, the information about the slot format for one or more cells among a plurality of cells from the base station. The UE applies the received slot format to all (or some) of the cells included in the same frequency band.

For example, in a case that the information about the slot format is reported, to the UE, for one cell included in a frequency band (or one frequency band), the UE applies the slot format also to another cell included in the same frequency band.

In a case that a plurality of cells with which the UE performs communication are included in the certain frequency band (or a combination of certain frequency bands), the base station may control scheduling such that the same slot format is applied to the plurality of cells included in the certain frequency band. In this case, the base station may transmit the information about the slot format for at least one cell included in the certain frequency band.

This can eliminate the need to configure separately and independently the slot format for the plurality of cells included in the same frequency band to reduce signaling overhead.

Alternatively, the base station may transmit the information about the same slot format for the respective cells included in the certain frequency band to the UE. In this case, in a case that the information about the slot format is reported, to the UE, for a plurality of cells included in a frequency band, the UE may assume (expect) that the slot formats reported for the respective cells are the same.

Figure 4:
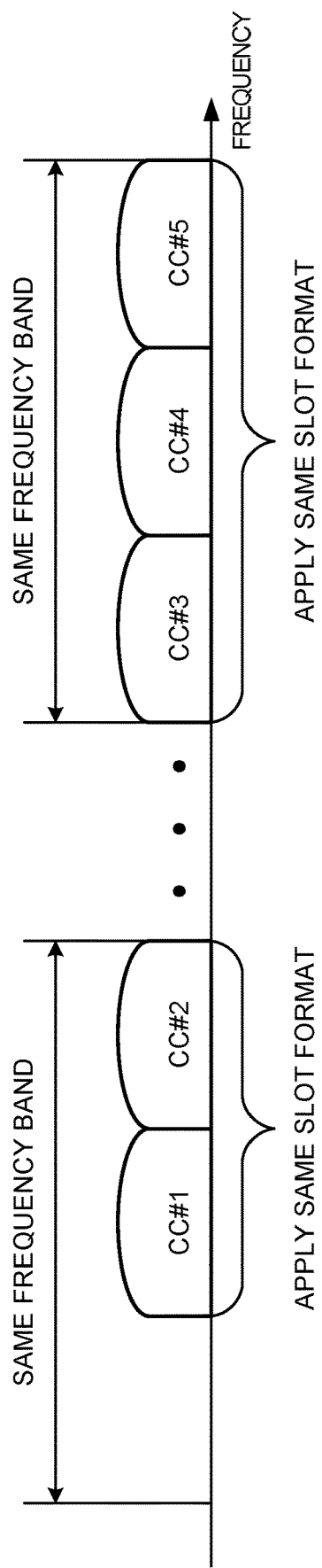
FIG. 4 is a diagram to show an example of control on the slot format in a case that a certain frequency domain is configured based on a frequency band.

FIG. 4 is a diagram to show an example of control on the slot format in the case that the certain frequency domain is configured based on the frequency band. The frequency band may include, for example, a first frequency band n1 of 1920 MHz to 1980 MHz, and a second frequency band n2 of 1850 MHz to 1910 MHz. Of course, an applicable frequency band is not limited to those described above.

FIG. 4 shows an example case that the same slot format (DL/UL/flex) is applied to the component carriers CC #1 and CC #2 included in the same frequency band. FIG. 4 also shows an example case that the same slot format (DL/UL/flex) is applied to component carriers CC #3, CC #4, an CC #5 which are included in a frequency band different from the band in which CC #1 and CC #2 are included. The base station (network) aligns the slot format (DL/UL/flex) applied to the component carriers included in the same frequency band for the user terminal.

In this way, by controlling such that the same slot format is applied to the cells included in the same frequency band, the interference between the DL reception and the UL transmission in the UE can be reduced.

(Aspect 2)

In Aspect 2, the cells to which the same slot format is applied are controlled based on the frequency range.

Specifically, this corresponds to the case that the certain frequency domain described above is the frequency range.

The UE receives, in a half-duplex operation, the information about the slot format for one or more cells among a plurality of cells included in the same frequency range from the base station. The UE applies the received slot format to all (or some) of the cells included in the same frequency range.

For example, in a case that the information about the slot format is reported, to the UE, for one cell included in a frequency range (or one frequency range), the UE applies the slot format also to another cell included in the same frequency range.

In a case that a plurality of cells with which the UE performs communication are included in the certain frequency range, the base station may control scheduling such that the same slot format is applied to the plurality of cells included in the certain frequency range. In this case, the base station may transmit the information about the slot format for at least one cell included in the certain frequency range.

This can eliminate the need to configure separately and independently the slot format for the plurality of cells included in the same frequency range to reduce signaling overhead.

Alternatively, the base station may transmit the information about the same slot format for the respective cells included in the certain frequency range to the UE. In this case, in a case that the information about the slot format is reported, to the UE, for a plurality of cells included in a frequency range, the UE may assume (expect) that the slot formats reported for the respective cells are the same.

Figure 5:
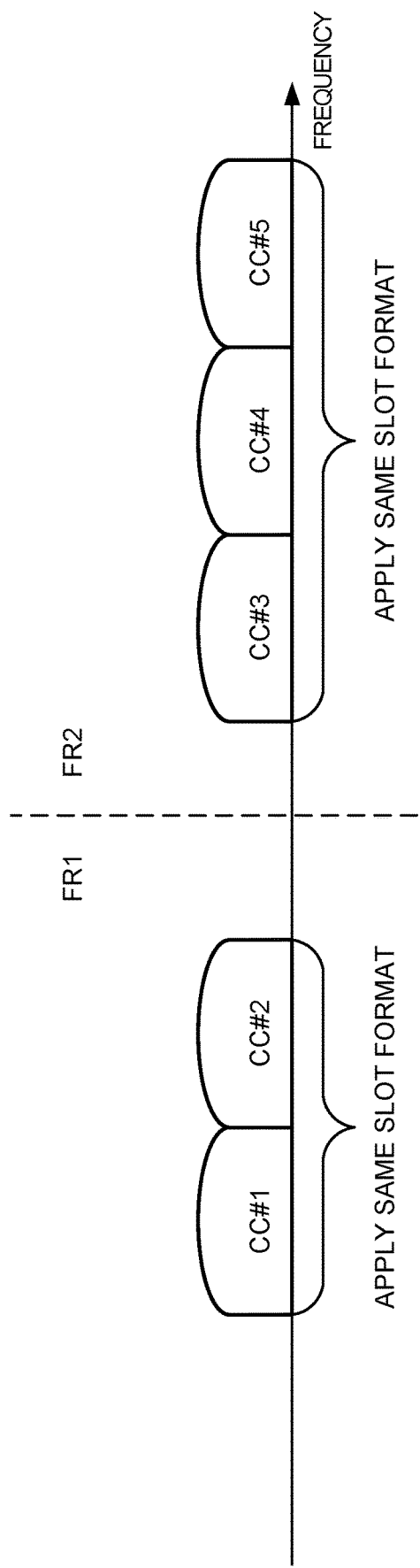
FIG. 5 is a diagram to show an example of control on the slot format in a case that a certain frequency domain is configured based on a frequency range.

FIG. 5 is a diagram to show an example of control on the slot format in a case that the certain frequency range is configured based on a frequency range. The frequency range may be defined by determining at least one critical frequency and a plurality of frequency ranges in accordance with the boundary frequency. In the example in FIG. 5, two frequency ranges FR1 and FR2 are determined in accordance with one boundary frequency.

For example, a first frequency range (FR1) may be a frequency band of 6 GHz or less (sub-6 GHz), and a second frequency range (FR2) may be a frequency band higher than 24 GHz (above-24 GHz). Moreover, FR1 may be defined as a frequency range using a subcarrier spacing (SCS) of at least one of 15, 30, and 60 kHz, and FR2 may be defined as a frequency range using a SCS of at least one of 60 and 120 kHz. Note that the frequency bands, definitions, and the like of FR1 and FR2 are not limited to those described above, and for example, FR1 may correspond to a frequency band which is higher than FR2.

In FIG. 5, the same slot format (DL/UL/flex) is applied to CC #1 and CC #2 included in the same frequency range FR1. Similarly, the same slot format (DL/UL/flex) is applied to CC #3, CC #4 and CC #5 included in the same frequency range FR2.

Note that the slot format applied to CC #1 and CC #2 included in the frequency range FR1 may be the same as or different from the slot format applied to CC #3, CC #4, and CC #5 included in the frequency range FR2. The network (for example, the base station) aligns the slot format (DL/UL/flex) applied to the CCs included in the same frequency range for the UE.

In this way, by controlling such that the same slot format is applied to the cells included in the same frequency range, the interference between the DL reception and the UL transmission in the UE can be reduced.

(Aspect 3)

In Aspect 3, the cells are controlled, to which cells applied is the same slot format for a combination of bands (or cells) for which the UE does not support the simultaneous transmission and reception of the DL and the UL. Specifically, the bands (or cells) to which the same slot format is applied are not determined based on the frequency domain, but are controlled based on whether the UE is configured to simultaneously receive and transmit the DL and the UL (for example, based on the UE capability). In this case, the slot format can be flexibly controlled for each UE.

For example, the base station may control such that the information about the same slot format is transmitted for a band combination, for which band combination it is reported from the UE that the simultaneous transmission and reception of the UL signal and the DL signal (UL transmission and DL reception) is not supported (false). Alternatively, the base station may control such that the information about the same slot format is transmitted for a band combination, for which band combination it is not reported from the UE that the simultaneous transmission and reception of the UL signal and the DL signal (UL transmission and DL reception) is supported (true).

Specifically, the base station grasps, based on whether the UE capability information is received from the UE, the band combination for which it is reported that the simultaneous transmission and reception of the UL signal and the DL signal (UL transmission and DL reception) is not supported (false), or the band combination for which it is not reported that the simultaneous transmission and reception of the UL signal and the DL signal (UL transmission and DL reception) is supported (true). The base station transmits the information about the slot format to the user terminal such that the same slot format is applied for each grasped band combination.

The UE may apply, based on the information about the slot format received from the base station, the same slot format reported for the certain cell to the band combination for which it is reported that the simultaneous transmission and reception of the UL signal and the DL signal (UL transmission and DL reception) is not supported, or the band combination for which it is not reported that the simultaneous transmission and reception of the UL signal and the DL (UL transmission and DL reception) is supported.

For example, the UE receives the information about the slot format for one or more cells among a plurality of cells from the base station. The UE applies the same slot format reported for the certain cell to the band combination for which it is reported that the simultaneous transmission and reception of the UL signal and the DL signal (UL transmission and DL reception) is not supported (false), or the band combination for which it is not reported that the simultaneous transmission and reception of the UL signal and the DL signal (UL transmission and DL reception) is supported (true).

For example, in a case that the information about one slot format is reported for the band combination for which it is reported that the simultaneous transmission and reception of the UL signal and the DL signal (UL transmission and DL reception) is not supported (false) (or one cell included in the band combination), the UE applies the slot format also to the relevant band combination. Alternatively, in a case that the information about one slot format is reported for the band combination (or one cell included in the band combination) for which it is not reported that the simultaneous transmission and reception of the UL signal and the DL signal (UL transmission and DL reception) is supported (true), the UE applies the slot format also to the band combination.

The base station may control scheduling such that the information about the same slot format is applied to a plurality of cells included in a band combination for which it is reported from the UE that the simultaneous transmission and reception of the UL signal and the DL signal (UL transmission and DL reception) is not supported (false). In this case, the base station may transmit the information about the slot format for at least one cell (or band) included in the band combination.

This can eliminate the need to configure separately and independently the slot format for the plurality of cells included in a certain band combination to reduce signaling overhead.

Alternatively, the base station may transmit the information about the same slot format for the respective cells (or bands) included in the certain band combination to the UE. In this case, in a case that the information about the slot format is reported, to the UE, for a plurality of cells included in the certain band combination, the UE may assume (expect) that the slot formats reported for the respective cells is the same.

Figure 6A:
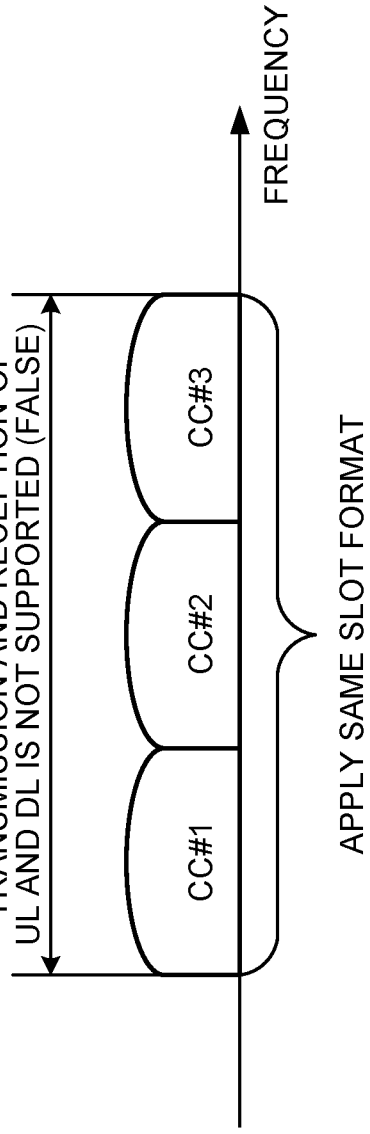
FIG. 6A and FIG. 6B are each a diagram to show an example of control on the slot format in a case of configuring based on a band combination.
Figure 6B:
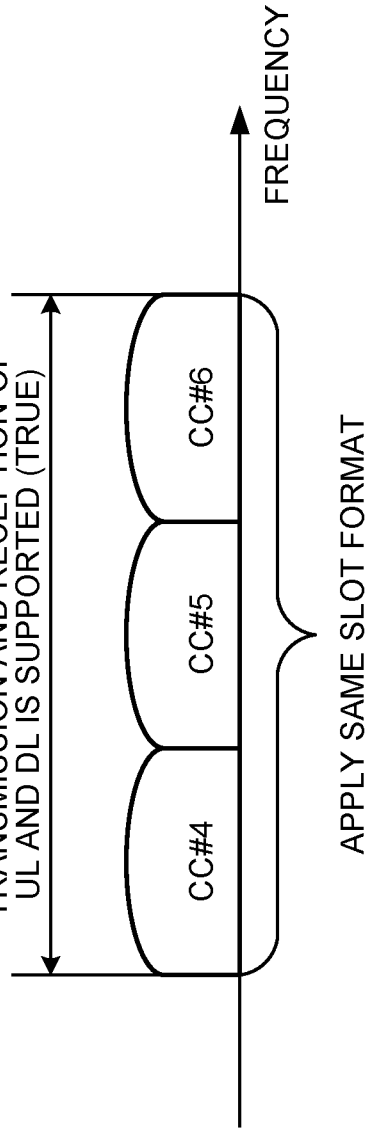

FIGS. 6A and 6B are diagrams to show an example of control on the slot format in a case of configuring based on a band combination. In FIG. 6A, the same slot format (DL/UL/flex) is applied to a band combination of CC #1, CC #2, and CC #3, for which band combination it is reported that the simultaneous transmission and reception of the UL signal and the DL signal (UL transmission and DL reception) is not supported (false).

In FIG. 6B, the same slot format (DL/UL/flex) is applied to a band combination of CC #4, CC #5, and CC #6, for which band combination it is not reported that the simultaneous transmission and reception of the UL signal and the DL signal (UL transmission and DL reception) is supported (true). The network (for example, base station) aligns the slot format (DL/UL/flex) applied to the CCs for the band combination for which it is reported that the simultaneous transmission and reception of the UL signal and the DL signal (UL transmission and DL reception) is not supported, or the band combination for which it is not reported that the simultaneous transmission and reception of the UL signal and the DL signal (UL transmission and DL reception) is supported.

In this way, by controlling such that the same slot format is applied to certain cells based on the band combination about whether the simultaneous transmission and reception of the UL and the DL is supported that is reported from the UE, the interference between the DL reception and the UL transmission in the UE can be reduced.

<Determination on Slot Format>

The above description describes the case that the information about the slot format is transmitted from the base station to the UE to configure, for the UE, the same slot format for a plurality of certain cells (or CCs).

However, in case that the information about the slot format is transmitted from the base station for each of a plurality of certain cells, a case that the slot format information corresponding to the respective cells are differently reported may occur. In this case, the UE receiving the information about a plurality of slot formats having contents different from each other may determine (uniform) the slot format applied to a plurality of cells based on certain criteria.

The certain criteria to be adopted may include any of criterion (1) to criterion (3) below.

Criterion (1): in a case that a plurality of CCs includes PCell/PSCell, a slot format corresponding to the PCell/PSCell is applied.

Criterion (2): a slot format corresponding to a CC having a minimum CC index among a plurality of CCs is applied.

Criterion (3): a slot format in which a certain sending direction is prioritized is applied.

For example, in a case that the UE receives the information about a plurality of slot formats having contents different from each other, the UE preferentially applies the information about the slot format for a certain CC (criterion (1) and (2)). Criterion (1) and criterion (2) may be adopted in combination. For example, in a case that a plurality of CCs do not include the PCell or the PSCell, a slot format corresponding to a CC having a minimum CC index may be applied.

Figure 7:
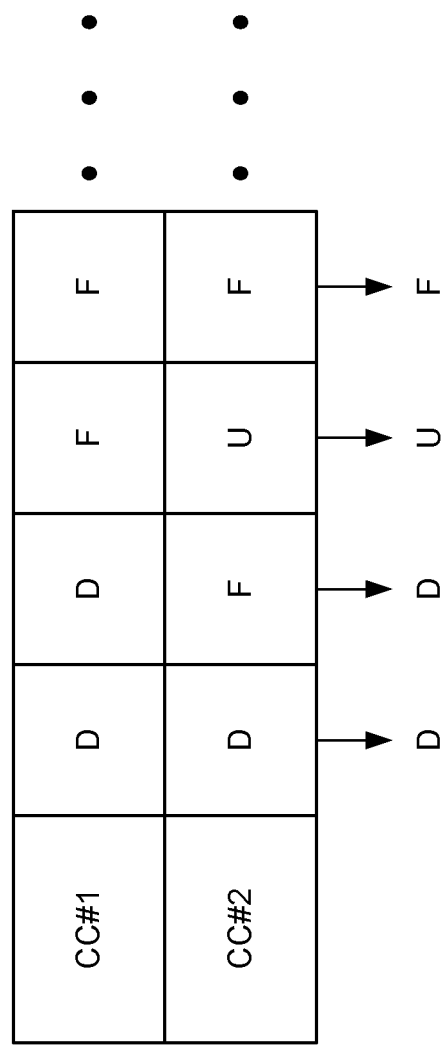
FIG. 7 is a diagram to show an example of uniforming of DL/UL/flex in a case that the slot formats applied to a plurality of cells are mutually different from each other.

In a case that criterion (3) is adopted, for example, the UL communication (U) may be prioritized more than flexibility (F), and the DL communication (D) may be prioritized more than the flexibility (F). FIG. 7 shows an example of determining (or uniforming) the slot format to be applied in a case that the slot formats reported for a plurality of CCs (or cells) are different from each other.

In the example in FIG. 7, CC #1 is configured with DL, DL, flex, and flex in a time series order, and CC #2 is configured with DL, flex, UL, and flex in a time series order. A portion where the formats of DL in CC #1 and flex in CC #2 are different is uniformed in to DL, and a portion where the formats of flex in CC #1 and UL in CC #2 are different is uniformed into UL.

Figure 8:
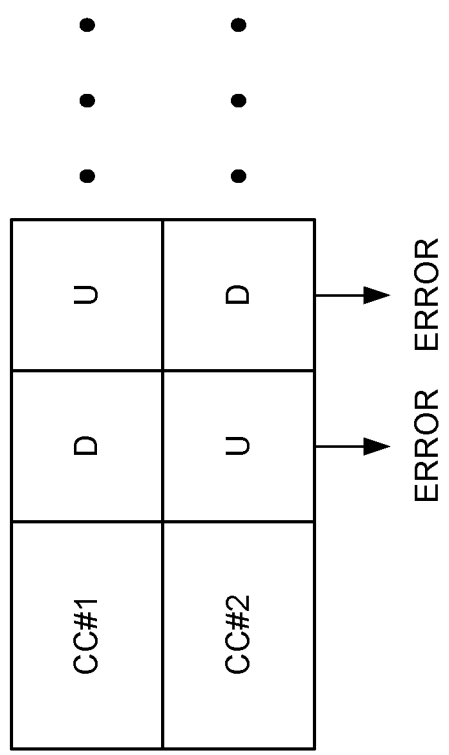
FIG. 8 is a diagram to show an example of a behavior of a user terminal in a case that the slot formats applied to a plurality of cells are mutually different from each other.

In the case that the criterion (3) is adopted, a case that specific different sending directions collide with each other in a plurality of slot formats reported to the UE may be dealt with as an error case. FIG. 8 is a diagram to show an example of a behavior of the user terminal in the case that the slot formats applied to a plurality of CCs are different from each other. The example in FIG. 8 shows a case that CC #1 and CC #2 are different about DL and UL. The user terminal may deal with this case as an error case to control such that transmission and reception of the UL signal and the DL signal (UL transmission and DL reception) are not performed at least for a period (for example, symbol) in which the UL communication and the DL communication collide with each other. Alternatively, the user terminal may perform the transmission and reception of any of the UL signal and the DL signal (UL transmission and DL reception), based on each implementation of the user terminal.

In this way, by controlling the method of determining the slot format, the UE can properly control the half-duplex communication even in the case that the slot format information mutually different for a plurality of certain cells are reported.

(Radio Communication System)

Hereinafter, a structure of a radio communication system according to the present embodiment will be described. In this radio communication system, at least one combination of the above plurality of aspects is used to perform communication.

Figure 9:
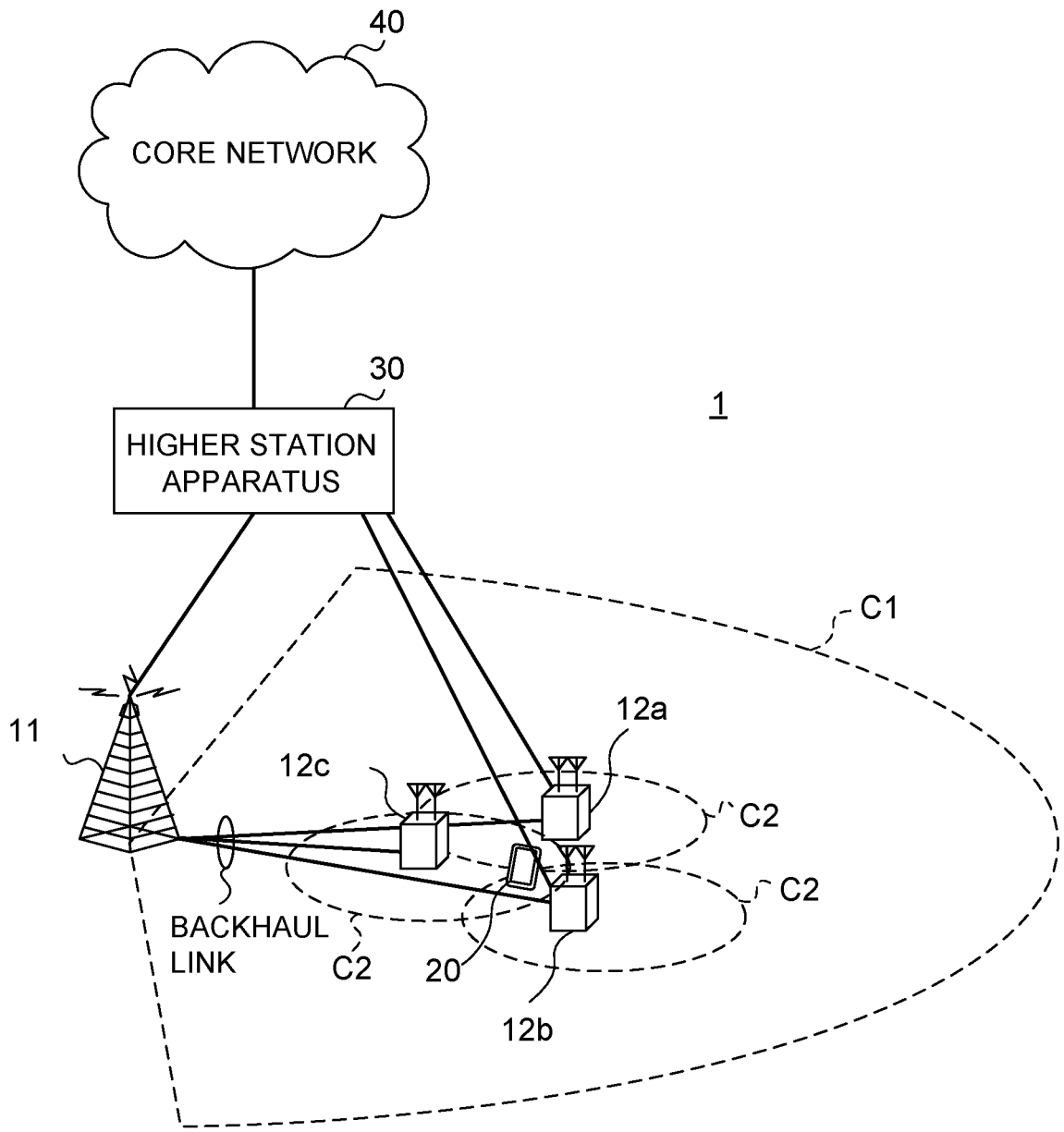
FIG. 9 is a diagram to show an example of a schematic structure of a radio communication system according to the present embodiment.

FIG. 9 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, a user terminal 20 is placed in the macro cell C1 and in each small cell C2. The arrangement, the number, and the like of cells and user terminal 20 are by no means limited to the aspect shown in the diagram.

The user terminal 20 can connect with both the radio base station 11 and the radio base stations 12. It is assumed that the user terminal 20 uses the macro cell C1 and the small cells C2 at the same time by means of CA or DC. The user terminals 20 can execute CA or DC by using a plurality of cells (CCs) (for example, five or less CCs, six or more CCs).

Between the user terminal 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminal 20 and the radio base stations 12, a carrier of a relatively high frequency band (for example, 3.5 GHz, 5 GHz, and so on) and a wide bandwidth may be used, or the same carrier as that used between the user terminal 20 and the radio base station 11 may be used. Note that the structure of the frequency band for use in each radio base station is by no means limited to these.

The user terminal 20 can perform communication by using time division duplex (TDD) and/or frequency division duplex (FDD) in each cell. Furthermore, in each cell (carrier), a single numerology may be employed, or a plurality of different numerologies may be employed.

The term "numerology" may refer to communication parameters applied to transmission and/or reception of a certain signal and/or channel, and may indicate, for example, at least one of a subcarrier spacing, a bandwidth, a symbol length, a cyclic prefix length, a subframe length, a TTI length, the number of symbols per TTI, a radio frame length, a filter processing, a windowing processing, and so on.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminal 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of a downlink control channel (PDCCH (Physical Downlink Control Channel) and/or EPDCCH (Enhanced Physical Downlink Control Channel), a PCFICH (Physical Control Format Indicator Channel), and a PHICH (Physical Hybrid-ARQ Indicator Channel). Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio link quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 10:
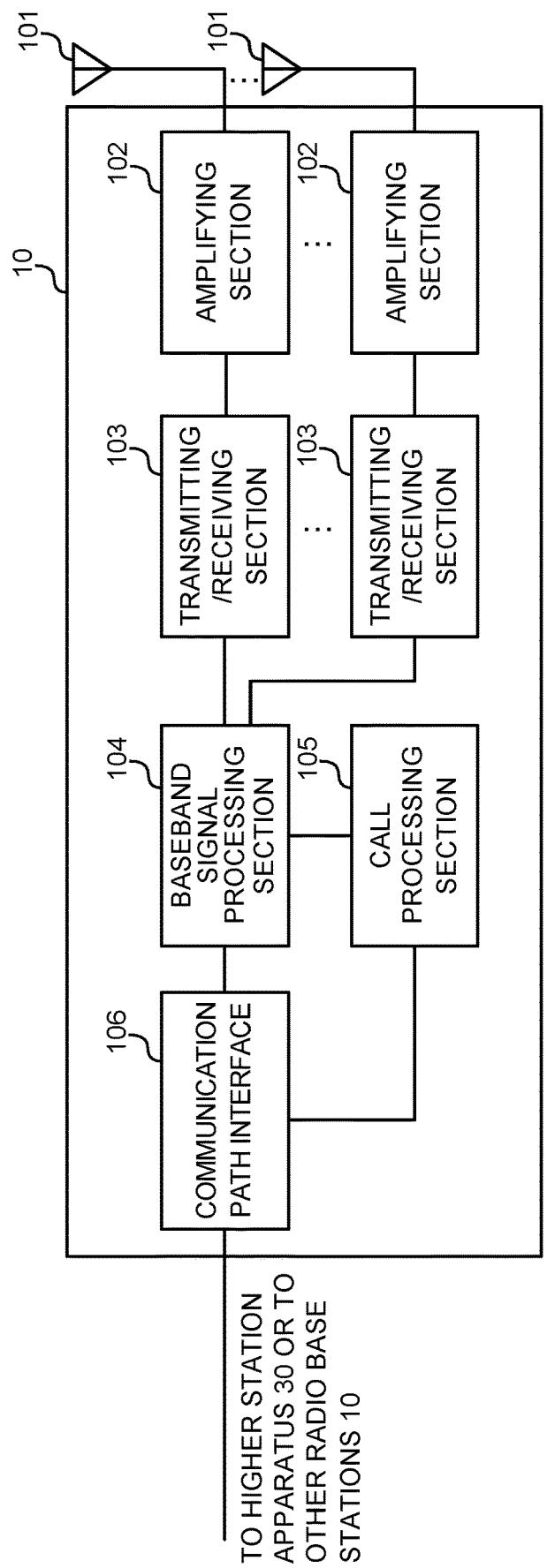
FIG. 10 is a diagram to show an example of an overall structure of a radio base station according to the present embodiment.

FIG. 10 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Note that each transmitting/receiving section 103 may further include an analog beamforming section performing analog beamforming. The analog beamforming section can be constituted with an analog beamforming circuit (for example, a phase shifter, a phase shift circuit), or an analog beamforming apparatus (for example, a phase shift device) described based on general understanding of the technical field to which the present invention pertains. The transmitting/receiving antennas 101 can be formed with an antenna array, for example. Each transmitting/receiving section 103 is configured to adopt a single BF and a multi BF.

The transmitting/receiving section 103 transmits the downlink (DL) signals (including at least one of DL data signals (downlink shared channels), DL control signals (downlink control channels), and DL reference signals) to the user terminal 20, and receives the uplink (UL) signals (including at least one of UL data signals, UL control signals, and UL reference signals) from the user terminal 20.

The transmitting/receiving section 103 transmits information about the slot formats for one or more cells. The transmitting/receiving section 103 may transmit the information about the slot format through at least one of the higher layer (for example, RRC signaling, or broadcast signal) and the downlink control information.

Figure 11:
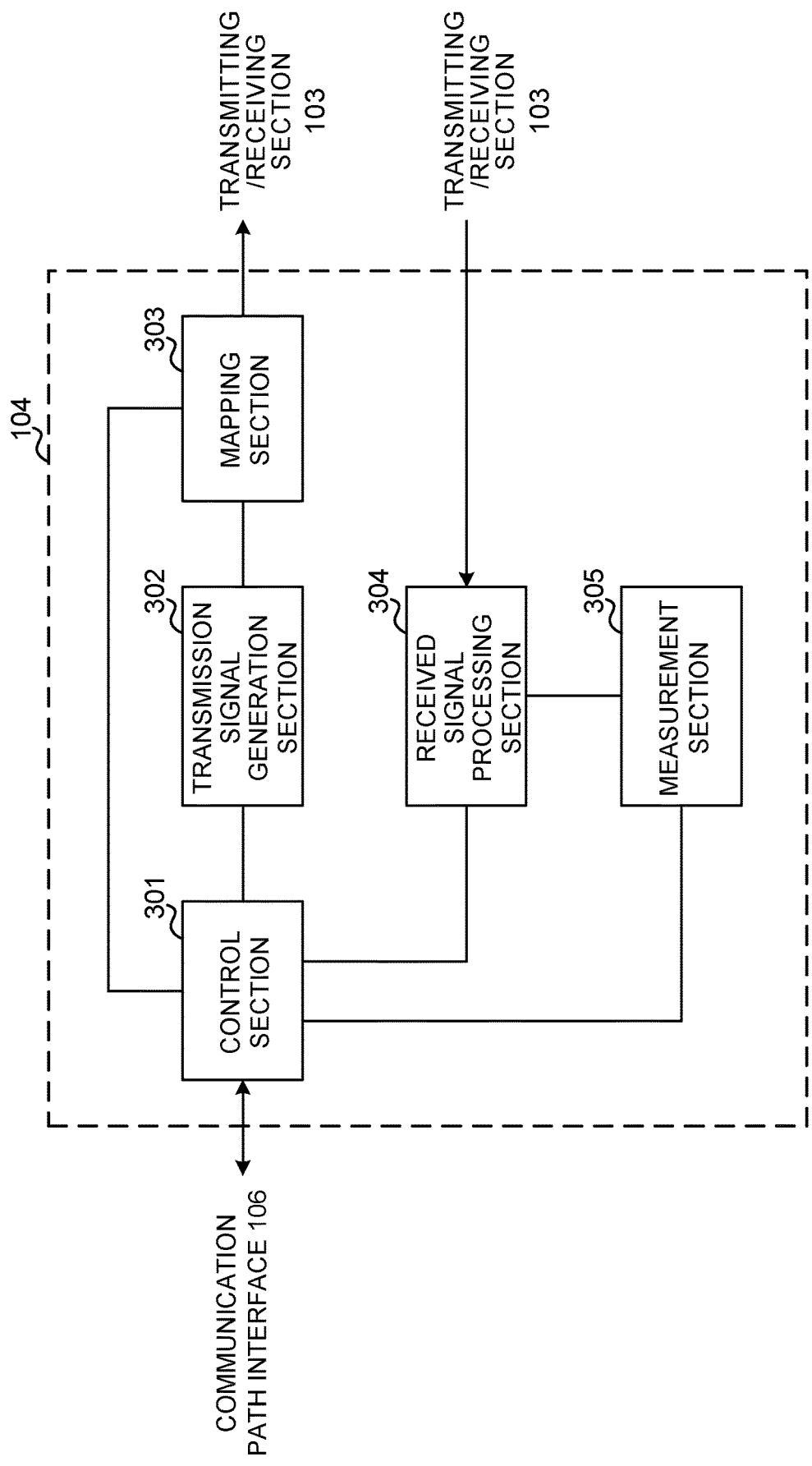
FIG. 11 is a diagram to show an example of a functional structure of the radio base station according to the present embodiment.

FIG. 11 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 may control the slot format configured for each cell, based on the UE capability information transmitted from the UE (for example, whether the simultaneous transmission and reception of the UL and the DL is supported, and the like). For example, the control section 301 may control such that the information about the same slot format for a plurality of cells included in a certain frequency domain is transmitted to the user terminal not supporting the full-duplex communication or the simultaneous transmission and reception of the UL signal and the DL signal (UL transmission and DL reception), or the user terminal adopting the half-duplex communication.

Alternatively, the control section 301 may control such that the information about the same slot format is transmitted for the band combination for which it is reported that the simultaneous transmission and reception of the UL signal and the DL signal (UL transmission and DL reception) is not supported, or the band combination for which it is not reported that the simultaneous transmission and reception of the UL signal and the DL signal (UL transmission and DL reception) is supported.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing and so on are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 12:
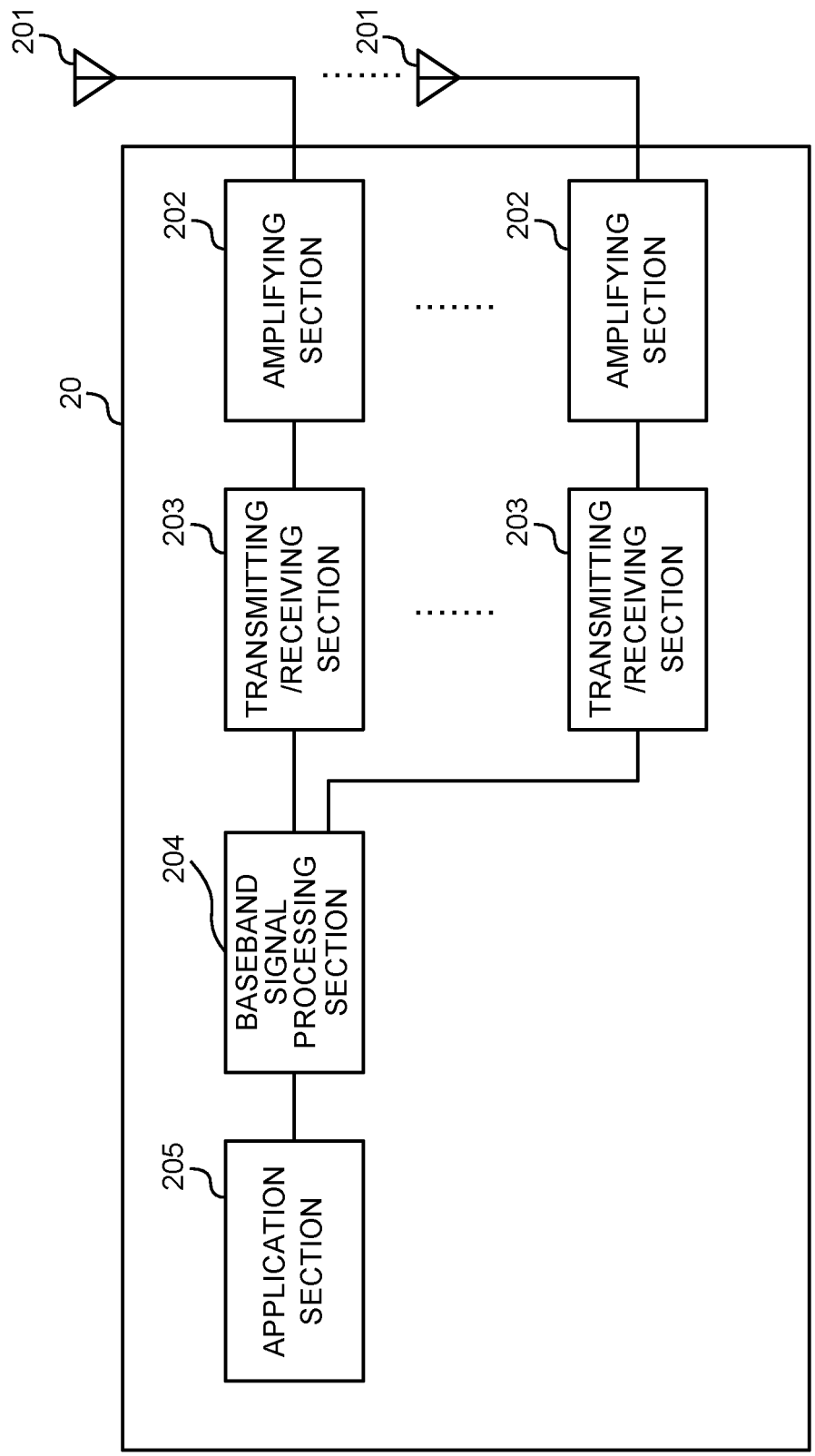
FIG. 12 is a diagram to show an example of an overall structure of a user terminal according to the present embodiment.

FIG. 12 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that each transmitting/receiving section 203 may further include an analog beamforming section performing analog beamforming. The analog beamforming section can be constituted with an analog beamforming circuit (for example, a phase shifter, a phase shift circuit), or an analog beamforming apparatus (for example, a phase shift device) described based on general understanding of the technical field to which the present invention pertains. The transmitting/receiving antennas 201 can be formed with an antenna array, for example. Each transmitting/receiving section 203 is configured to adopt a single BF and a multi BF.

The transmitting/receiving section 203 receives the downlink (DL) signals (including at least one of DL data signals (downlink shared channels), DL control signals (downlink control channels), and DL reference signals) from the radio base station 10, and transmit the uplink (UL) signals (including at least one of UL data signals, UL control signals, and UL reference signals) to the radio base station 10.

The transmitting/receiving section 203 receives information about the slot formats for one or more cells. The transmitting/receiving section 203 may receive the information about the slot format through at least one of the higher layer (for example, RRC signaling, or broadcast signal) and the downlink control information.

Figure 13:
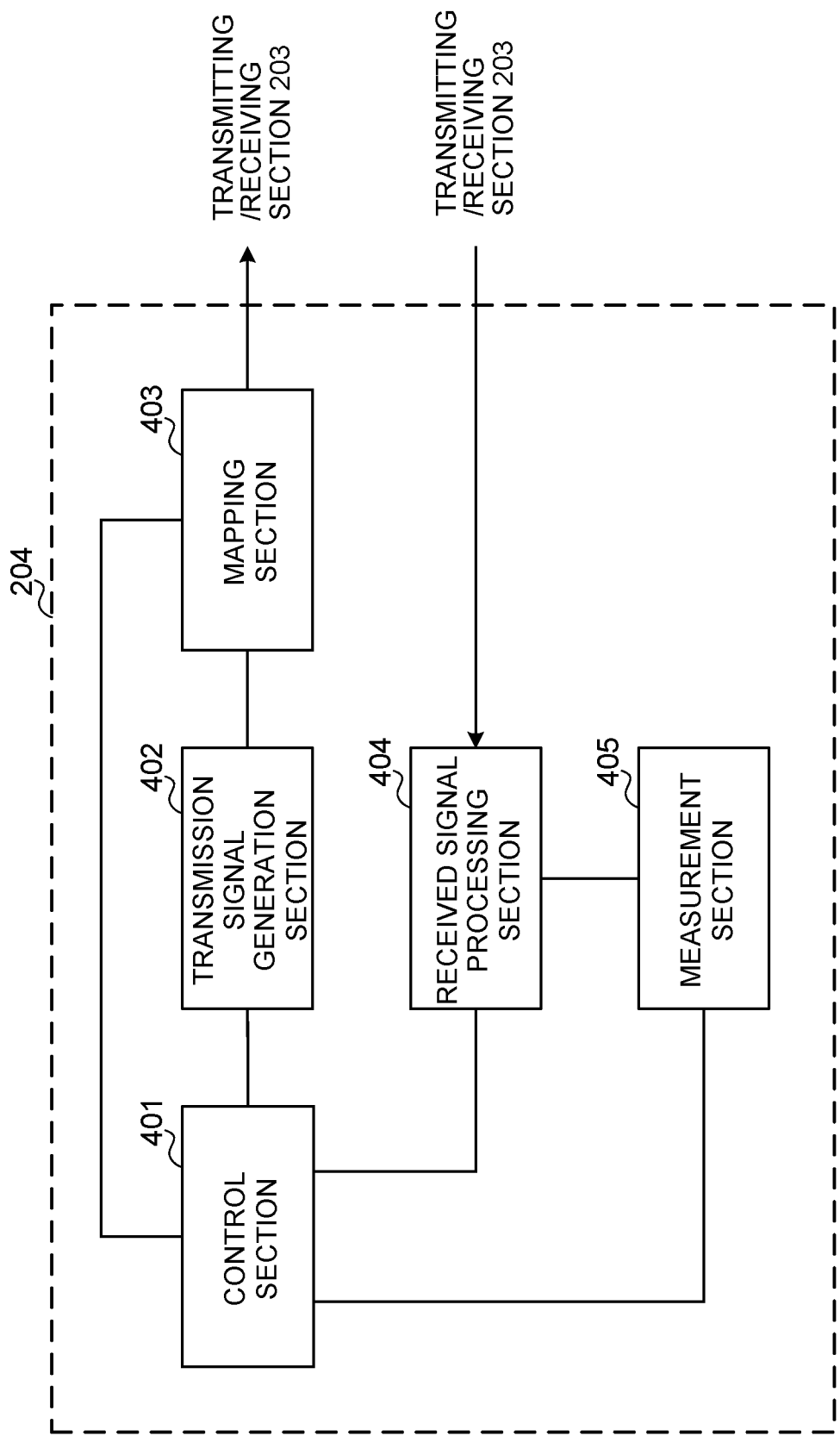
FIG. 13 is a diagram to show an example of a functional structure of the user terminal according to the present embodiment.

FIG. 13 is a diagram to show an example of a functional structure of the user terminal according to the present embodiment. Note that, this example primarily shows functional blocks that pertain to characteristic parts of the present embodiment, and the user terminal 20 may be assumed to include other functional blocks that are necessary for radio communication.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control the slot format configured for each cell, based on the UE capability information (for example, whether the simultaneous transmission and reception of the UL and the DL is supported, and the like). For example, the control section 401 may determine the slot format of each cell, based on the information about the slot format transmitted from the base station, and whether the full-duplex communication is supported or whether the simultaneous transmission and reception of the UL signal and the DL signal (UL transmission and DL reception) is supported.

The control section 401 may apply the same slot format to a plurality of cells included in a certain frequency domain, in the case that the full-duplex communication, or the simultaneous transmission and reception of the UL signal and the DL signal (UL transmission and DL reception) is not supported, or in the case that the half-duplex is adopted.

The control section 401 may determine a slot format of another cell included in the certain frequency domain, based on the information about the slot format reported for a certain cell (<Aspect 1> and <Aspect 2> in the second aspect, and the like). Alternatively, the control section 401 may assume (expect) that the information about the slot formats reported for the plurality of cells included in the certain frequency domain is the same (<Aspect 1> and <Aspect 2> in the second aspect, and the like). Alternatively, the control section 401 may apply the same slot format reported for the certain cell to the band combination for which it is reported that the simultaneous transmission and reception of the UL signal and the DL signal (UL transmission and DL reception) is not supported, or the band combination for which it is not reported that the simultaneous transmission and reception of the UL signal and the DL signal (UL transmission and DL reception) is supported (<Aspect 3> in the second aspect, and the like).

The control section 401 may control such that the transmission and reception is performed without assuming (do not expecting) the UL signal transmission (performing UL transmission) for a period of receiving the DL signal and for a period of a certain range from a DL symbol in which the DL signal is received, and without assuming (do not expecting) the DL signal reception (performing DL reception) for a period of transmitting the UL signal (the first aspect, and the like).

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire or wireless) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
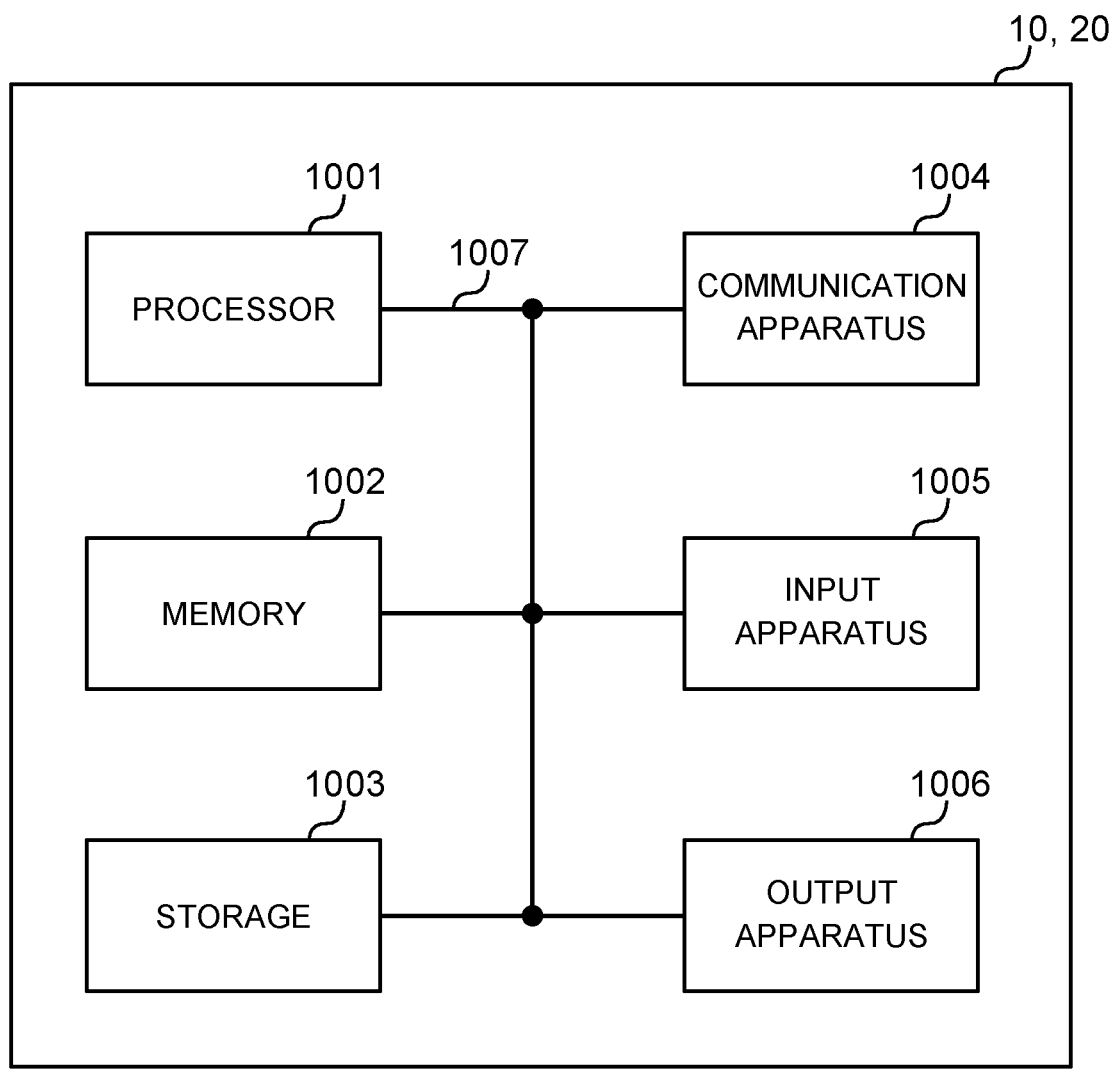
FIG. 14 is a diagram to show an example of a hardware structure of the radio base station and the user terminal according to the present embodiment.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminal 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004. The transmitting/receiving section 103 may be implemented to be physically or logically separated into a transmitting section 103*a* and a receiving section 103*b*.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, codewords, or the like, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "partial bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as "precoding," a "precoder," a "weight (precoding wait)," "quasi-co-location (QCL)," a "transmit power," a "phase rotation," an "antenna port," an "antenna port group," a "layer," "the number of layers," a "rank," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into a plurality of smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal," and the like may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be also referred to as a transmission apparatus, a reception apparatus, a communication apparatus, and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, the user terminal 20 may have the functions of the base station 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, or the like, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a transmitter that performs uplink (UL) transmission in at least one of a physical uplink control channel (PUCCH) and a physical uplink shared channel (PUSCH), and
   a receiver that performs downlink (DL) reception in at least one of a physical downlink control channel (PDCCH) and a physical downlink shared channel (PDSCH),
   wherein the transmitter, when a frequency range is a first frequency range, does not perform the UL transmission until a first period corresponding to the first frequency range has elapsed after a last symbol of the DL reception,
   the transmitter, when the frequency range is a second frequency range, does not perform the UL transmission until a second period corresponding to the second frequency range has elapsed after the last symbol of the DL reception,
   the first frequency range and the second frequency range are mutually different,
   the first period and the second period are mutually different,
   the second frequency range is a frequency band higher than 24 GHz, and
   the first period and the second period are each defined by a multiplication of parameter $N_{RX\text{-}TX}$ and parameter $T_C$, with at least one of the parameter $N_{RX\_TX}$ and the parameter $T_C$ for the first frequency range being different from the at least one of the parameter $N_{RX\text{-}TX}$ and the parameter $T_C$ for the second frequency range.

2. A radio communication method for a terminal, the method comprising:
   performing uplink (UL) transmission in at least one of a physical uplink control channel (PUCCH) and a physical uplink shared channel (PUSCH), and
   performing downlink (DL) reception in at least one of a physical downlink control channel (PDCCH) and a physical downlink shared channel (PDSCH),
   wherein, when a frequency range is a first frequency range, the UL transmission is not performed until a first period corresponding to the first frequency range has elapsed after a last symbol of the DL reception,
   when the frequency range is a second frequency range, the UL transmission is not performed until a second period corresponding to the second frequency range has elapsed after the last symbol of the DL reception,
   the first frequency range and the second frequency range are mutually different,
   the first period and the second period are mutually different,
   the second frequency range is a frequency band higher than 24 GHz, and
   the first period and the second period are each defined by a multiplication of parameter $N_{RX\text{-}TX}$ and parameter $T_C$, with at least one of the parameter $N_{RX\text{-}TX}$ and the parameter $T_C$ for the first frequency range being different from the at least one of the parameter $N_{RX\text{-}TX}$ and the parameter $T_C$ for the second frequency range.

3. A base station that communicates with a terminal, the base station comprising:
   a receiver that performs uplink (UL) reception from the terminal in at least one of a physical uplink control channel (PUCCH) and a physical uplink shared channel (PUSCH),
   a transmitter that performs downlink (DL) transmission to the terminal in at least one of a physical downlink control channel (PDCCH) and a physical downlink shared channel (PDSCH), and
   a processor that, when a frequency range is a first frequency range, does not assume the UL reception until a first period corresponding to the first frequency range has elapsed after a last symbol of the DL transmission, and when the frequency range is a second frequency range, does not assume the UL reception until a second period corresponding to the second frequency range has elapsed after the last symbol of the DL transmission,
   the first frequency range and the second frequency range are mutually different,
   the first period and the second period are mutually different,
   the second frequency range is a frequency band higher than 24 GHz, and
   the first period and the second period are each defined by a multiplication of parameter $N_{RX\text{-}TX}$ and parameter $T_C$, with at least one of the parameter $N_{RX\text{-}TX}$ and the parameter $T_C$ for the first frequency range being different from the at least one of the parameter $N_{RX\text{-}TX}$ and the parameter $T_C$ for the second frequency range.

4. A system comprising a base station and a terminal, wherein:
 the base station comprises:
  a receiver that performs uplink (UL) reception from the terminal in at least one of a physical uplink control channel (PUCCH) and a physical uplink shared channel (PUSCH), and
  a transmitter that performs downlink (DL) transmission to the terminal in at least one of a physical downlink control channel (PDCCH) and a physical downlink shared channel (PDSCH), and
 the terminal comprises:
  a transmitter that performs UL transmission in at least one of the PUCCH and the PUSCH, and
  a receiver that performs DL reception in at least one of the PDCCH and the PDSCH,
  wherein the transmitter of the terminal, when a frequency range is a first frequency range, does not perform the UL transmission until a first period corresponding to the first frequency range has elapsed after a last symbol of the DL reception,
  the transmitter of the terminal, when the frequency range is a second frequency range, does not perform the UL transmission until a second period corresponding to the second frequency range has elapsed after the last symbol of the DL reception,
  the first frequency range and the second frequency range are mutually different,
  the first period and the second period are mutually different,
  the second frequency range is a frequency band higher than 24 GHz, and
  the first period and the second period are each defined by a multiplication of parameter $N_{RX\text{-}TX}$ and parameter $T_C$, with at least one of the parameter $N_{RX\text{-}TX}$ and the parameter $T_C$ for the first frequency range being different from the at least one of the parameter $N_{RX\text{-}TX}$ and the parameter $T_C$ for the second frequency range.

* * * * *